(12) United States Patent
Mori et al.

(10) Patent No.: US 7,623,652 B2
(45) Date of Patent: Nov. 24, 2009

(54) ELECTRONIC DEVICE, INPUT DEVICE, AND PORTABLE ELECTRONIC DEVICE USING THE SAME

(75) Inventors: Akitoshi Mori, Yokohama (JP); Katsumasa Yamaguchi, Yokohama (JP); Toshiaki Saitoh, Sendai (JP); Teruyuki Kimata, Kadoma (JP); Shunichi Yonekubo, Yokohama (JP); Tamotsu Yamamoto, Kadoma (JP)

(73) Assignee: Panasonic Corporation, Osaka (JP)

( * ) Notice: Subject to any disclaimer, the term of this patent is extended or adjusted under 35 U.S.C. 154(b) by 516 days.

(21) Appl. No.: 10/570,559

(22) PCT Filed: Sep. 3, 2004

(86) PCT No.: PCT/JP2004/013174

§ 371 (c)(1),
(2), (4) Date: Mar. 3, 2006

(87) PCT Pub. No.: WO2005/024616

PCT Pub. Date: Mar. 17, 2005

(65) Prior Publication Data

US 2007/0037611 A1    Feb. 15, 2007

(30) Foreign Application Priority Data

Sep. 4, 2003  (JP) .............................. 2003-312873
Sep. 17, 2003 (JP) .............................. 2003-324807

(51) Int. Cl.
*H04M 1/00* (2006.01)
*H04M 3/00* (2006.01)

(52) U.S. Cl. ..................................................... 379/367
(58) Field of Classification Search ................. 379/367

See application file for complete search history.

(56) References Cited

U.S. PATENT DOCUMENTS

| | | | | |
|---|---|---|---|---|
| 4,185,281 A | * | 1/1980 | Silverstone | .................. 345/184 |
| 5,461,376 A | * | 10/1995 | Oono et al. | .................... 341/22 |
| 6,062,749 A | | 5/2000 | Oikawa et al. | |
| 2002/0015102 A1 | * | 2/2002 | Itoh et al. | .............. 348/333.06 |
| 2004/0121816 A1 | * | 6/2004 | Yang | ........................... 455/565 |

FOREIGN PATENT DOCUMENTS

| | | | |
|---|---|---|---|
| FI | EP 463856 A | * | 6/1991 |
| JP | 7-201256 | | 8/1995 |
| JP | 9-167045 | | 6/1997 |
| JP | 10-74429 | | 3/1998 |
| JP | 10-91329 | | 4/1998 |
| JP | 10-222269 | | 8/1998 |

(Continued)

*Primary Examiner*—Alexander Jamal
(74) *Attorney, Agent, or Firm*—Pearne & Gordon LLP

(57) ABSTRACT

An object of the present invention is to provide an electronic device that can be operated as imagined while checking display contents because the display contents on a displaying unit and an operation applied to an operating unit are linked together. An electronic device of the present invention includes a second operation button (4), a display portion (2), and a control portion (6) that controls a display on the display portion (2) in response to operations of the second operation button (4), a first operation button (3), and the like, wherein the control portion (6) changes display contents on the display portion (2) to link together with a tracing operation applied to the second operation button (4).

5 Claims, 9 Drawing Sheets

FOREIGN PATENT DOCUMENTS

| | | |
|---|---|---|
| JP | 11-194872 | 7/1999 |
| JP | 2001-291089 | 10/2001 |
| JP | 2001-331253 | 11/2001 |
| JP | 2002-215290 | 7/2002 |
| JP | 2002-251247 | 9/2002 |
| JP | 2003-29896 | 1/2003 |

* cited by examiner

WHILE THE CHARACTER INPUTTING....

FIRST OPERATION BUTTON: KANJI CONVERSION

SECOND OPERATION BUTTON: PREDICTIVE CANDIDATE SELECTION

_US 7,623,652 B2_

ELECTRONIC DEVICE, INPUT DEVICE, AND PORTABLE ELECTRONIC DEVICE USING THE SAME

TECHNICAL FIELD

The present invention relates to an electronic device including an operating unit, and a displaying unit for executing a display corresponding to the operation of the operating unit.

Also, the present invention relates to an input device capable of executing various operations such as scroll, cursor movement, icon selection, and the like of various information that are displayed on a display portion, and a mobile electronic device equipped with the input device such as a cellular phone, a mobile information terminal, a remote control device, or the like.

BACKGROUND ART

In the mobile electronic device such as the mobile phone device, or the like, the direction operation key used to execute a selection of menu items displayed on the display portion, etc., for example, is provided. Also, the direction operation key is used to execute the operation in response to the contents displayed on the display portion, for example, to change an area of a map displayed when the user executes a map search. The key in which the switch is arranged in four directions on the upper/lower and right/left sides respectively is most popular as such direction operation key. In addition, various types of keys such as the roller type used to select, scroll, or the like the display contents by turning the key, the stick type, and the like are known (see Patent Literature 1).

The display contents on the display portion are displayed by arranging the icons indicating respective menu items in four directions on the upper/lower and right/left sides in response to the operable directions of the direction operation key or moving (scrolling) the screen display longitudinally and laterally, for example. Also, the direction operation key is easy to operate because this key is provided in the position in which such key can be operated with the thumb of one hand.

As the mobile electronic device such as the cellular phone, or the like, the device equipped with the operation portion to which various keys for inputting the information are provided and the display portion for displaying various input information in answer to the key operation of this operation portion is known.

Also, as the display portion, the display constructed to select the desired item among various menu items, and the like in answer to the key operation of the operation portion and display the selected item is known. Meanwhile, as the operation portion to which such key operation is applied, for example, the device constructed to have the direction operation key used to select the menu items, the decision button used to define the selected content, and the like (this device is referred to as an "input device" hereinafter) is also known.

The direction operation key in such input device is used to execute the operation in response to the contents displayed on the display portion, for example, to move/change an area on a map displayed when the map is searched, or the like. Also, as such direction operation key, the key in which four switches are arranged equiangularly in four directions on the upper/lower and right/left sides respectively is popular. In addition, the keys having various shapes and configurations such as the roller type used to select or scroll the display contents displayed on the display portion by executing a turning operation in the circumferential direction, the stick type, and the like are known.

In contrast, as the decision button, the button arranged in the center portion of the direction operation key, the button arranged in a separate position different from the direction operation key, and the like are known (see Patent Literature 2, for example).

By the way, as the method of displaying various information on the display portion, for example, the method of arranging the icons indicating respective menu items in four directions on the upper/lower and right/left sides to correspond to the operation positions of the direction operation key, the method of moving (scrolling) the screen display longitudinally and laterally to display the information, and the like are known. Also, since the direction operation key is provided in a predetermined position such that it can be operated with the thumb of one hand, such key is easy to operate.

(Patent Literature 1) JP-A-11-194872
(Patent Literature 2) JP-A-2001-331253 (FIG. 2, FIG. 6)

DISCLOSURE OF THE INVENTION

However, in the mobile electronic device in the prior art, the operating direction of the direction operation key is restricted. Hence, when the display contents on the display portion and the operable directions of the direction operation key do not agree with each other, e.g., the complicated operations are required, or the like, the operating direction of the direction operation key must be changed or simplified with regard to the display contents. Therefore, in the mobile electronic device in the prior art, sometimes the operating direction and the display contents do not agree with each other or the operating direction and a change of the display contents following upon the operation are not linked together.

The present invention has been made in view of the above circumstances in the prior art, and aims at providing an electronic device that can be operated as imagined while checking the display contents because the display contents on a displaying unit and an operation of an operating unit are linked together.

An electronic device of the present invention includes an operating unit; a displaying unit; and a controlling unit for controlling a display on the displaying unit in response to an operation of the operating unit; wherein the operating unit senses an operation direction and an operation speed, and the controlling unit changes display contents on the displaying unit based on a sensed result in accordance with the operation applied to the operating unit.

According to this configuration, when the operating unit is operated, the display contents on the displaying unit are changed based on the operation direction and the operation speed of the operating unit, whereby the display contents on the displaying unit and the operation applied to the operating unit are linked together. Therefore, the operator can take a desired operation as imagined while checking the display contents. As a result, the electronic device becomes more convenient.

Also, in the electronic device of the present invention, a geometrical shape of the display contents displayed on the displaying unit are previously determined to correspond with operable directions of the operating unit. According to this configuration, for example, in case of a plurality of icons displayed on the displaying unit are arranged circularly, the display contents can be changed by operating the operating unit to draw a circle such that a position of an icon is moved as imagined.

Also, in the electronic device of the present invention, the controlling unit changes the display contents displayed on the displaying unit so that a changing direction of the display contents displayed on the displaying unit at least partially corresponds with a direction of the operation applied to the operating unit. According to this configuration, for example, when an image of an analog clock is displayed on the displaying unit, the display contents can be changed by operating the operating unit to draw a circle such that a hand of a clock is turned as imagined.

Also, in the electronic device of the present invention, the controlling unit changes the display contents on the displaying unit at a speed that is corresponded to a speed of the operation applied to the operating unit. According to this configuration, for example, when the operating unit is operated quickly, the display contents on the displaying unit are also changed quickly. Therefore, the operator can take the desired operation as imagined while checking the display contents. As a result, the electronic device becomes further convenient.

Also, in the electronic device of the present invention, a function of changing the display contents by the operation of the operating unit is switched in response to the display contents on the displaying unit. According to this configuration, the controlling unit can fulfill a function, which deals with the display contents on the displaying unit, out of a plurality of functions provided to the operating unit in such a manner that, for example, when texts are displayed on the displaying unit, the controlling unit changes the display contents to display an continuation of the texts and, for example, when a map image is displayed on the displaying unit, the controlling unit enlarges/reduces the map display.

Also, in the electronic device of the present invention, the controlling unit scrolls the display contents on the displaying unit in response to the operation direction and the operation speed of the operating unit. According to this configuration, the display contents on the displaying unit can be scrolled in the way the operator wants.

Also, in the electronic device of the present invention, the controlling unit enlarges the display contents on the displaying unit when the operating unit is operated in one direction, and scales down the display contents on the displaying unit when the operating unit is operated in other direction. According to this configuration, the display contents on the displaying unit can be enlarged and reduced as imagined.

Also, in the electronic device of the present invention, the operating unit senses the operation direction by sensing a pressure. According to this configuration, the operating unit can be operated easily with a single finger.

Also, in the electronic device of the present invention, the operating unit senses the operation position every predetermined time in response to a tracing operation, and calculates the operation direction and the operation speed. According to this configuration, there is no need to provide sliding members and mechanism. Therefore, wear and tear of the parts can be reduced and thus the long-lived operating portion can be provided.

In addition, the electronic device of the present invention, the operating unit has an annular operation button, and senses the operation direction and the operation speed in response to a circular tracing operation. According to this configuration, the display contents on the displaying unit can be changed to link with the circular tracing operation.

Also, in the input device provided to the mobile electronic device in the prior art, the number of the direction operation button and the operating direction are restricted. Hence, in case the complicated operations are required, or the like, the display contents on the display portion must be simplified or the operating direction must be changed. For example, when the user wishes to rotate the display contents on the display portion, the rotation input must be "converted" into the lateral input, or the like because there is no device that can handle the rotation input.

Therefore, since either the display contents displayed on the display portion are restricted or the menu structure is hierarchized into many layers, the displaying process required for the display portion or the operation of the operation button, or the like becomes complicated. Otherwise, since the display contents displayed on the display portion are too dissociated from the operating image of the direction operation button and thus the correlation between the operating button and the display contents is weakened, it is hard to link the button to the display contents or the button and the display contents are not linked together.

The present invention has been made in view of the above circumstances in the prior art, and aims at providing an input device and a mobile electronic device capable of inputting the information in various modes not to impose a limitation on the display contents on the display device, and also capable of executing an inputting operation with the thumb of one hand, or the like in a way that is linked with the display contents.

An input device of the present invention includes a substantially circular center button provided in a center portion; and a plurality of peripheral buttons arranged in multiple-concentrically on an outer side to surround the center button; wherein the center button and the peripheral buttons are arranged within an area that can be covered with a finger of a fixed hand.

According to this configuration, the center button composed of the decision button and the peripheral buttons composed of the first and second operation buttons are constructed within an area that is covered with a finger of the fixed hand, for example. Therefore, the defining operation equivalent to the prior art and the operation in the upward/downward and rightward/leftward directions can be handled with one hand while using the decision button and any one of the operation buttons, and in addition information input can be handled with the operation of one hand in various modes by using the other operation button.

Also, in the input device of the present invention, a physical clearance to avoid a wrong operation of another peripheral button when one peripheral button is operated is provided between the peripheral buttons respectively.

According to this configuration, the clearance is ensured. Therefore, when any button is operated, such button does not touch other button or the operation of other button can be prevented even though such button touches other button, and thus the wrong operation of the button can be prevented.

Also, in the input device of the present invention, the peripheral buttons have a different operating load to each other.

According to this configuration, when any peripheral button is operated, a difference of a operating feeling is caused. Therefore, such a trouble that another peripheral button is operated wrongly can be prevented based on a feeling of the operating finger not to especially depend on operator's eyesight, and a smooth button operation can be realized.

Also, in the input device of the present invention, the center button and the peripheral buttons are coupled via an elastic body with a buffering function.

According to this configuration, when any operation button is operated, the transfer of that operation to other operation button can be suppressed to the lowest minimum, and in turn the wrong operation of the button can be prevented.

Also, in the input device of the present invention, the peripheral buttons are held on a part of the elastic body.

According to this configuration, a clearance can be formed between respective buttons and the switches that are turned ON/OFF by this pushing operation, and an operation stroke for the button pushing operation can be ensured.

Also, in the input device of the present invention the peripheral buttons are formed by a different peculiar surface shape and or a different peculiar material to each other.

According to this configuration, when either of the peripheral buttons is operated, it can be discriminated which operation button is pushed down, based on a feeling of the operating finger independently of operator's eyesight, or the like. Therefore, the wrong operation of another peripheral button can be prevented and the button operation made by the touch-typing can be facilitated.

Also, in the input device of the present invention, the peripheral buttons perform an input of information independently separately from the center button.

According to this configuration, in the mobile electronic device having the displaying unit, the controlling unit, and the like, when the center button is constructed by the decision button and the peripheral buttons are constructed by the operation button used to select the menu item, and the like, the selected item displayed on the displaying unit can be switched only by the operation button not to operate the decision button. Therefore, a menu structure can be simplified.

Also, in the input device of the present invention, the peripheral buttons include a first operation button and a second operation button, and one of the first operation button and the second operation button has a convex surface shape and the other has a concave surface shape.

According to this configuration, when one operation button is operated, the touch of the finger to other operation button can be suppressed to the lowest minimum, and in turn the wrong operation of the button can be prevented.

A mobile electronic device of the present invention includes the input device as above described; a displaying unit for displaying information input by the input device; and a controlling unit for controlling a display on the displaying unit in response to an operation of each button provided to the input device; wherein the input device has a function of sensing whether or not the operation of each button is present and sensing an operation direction and an operation speed, and the controlling unit has a function of changing display contents on the displaying unit based on a sensed result to link with the operation of each button.

According to this configuration, it is feasible to accomplish the mobile electronic device having the input device which can handle the defining operation equivalent to the prior art and the operation in the upward/downward and rightward/leftward directions with one hand while using the decision button and any one of the operation buttons and in addition can handled the information input with the operation of one hand in various modes by using the other operation button.

Figure 1:
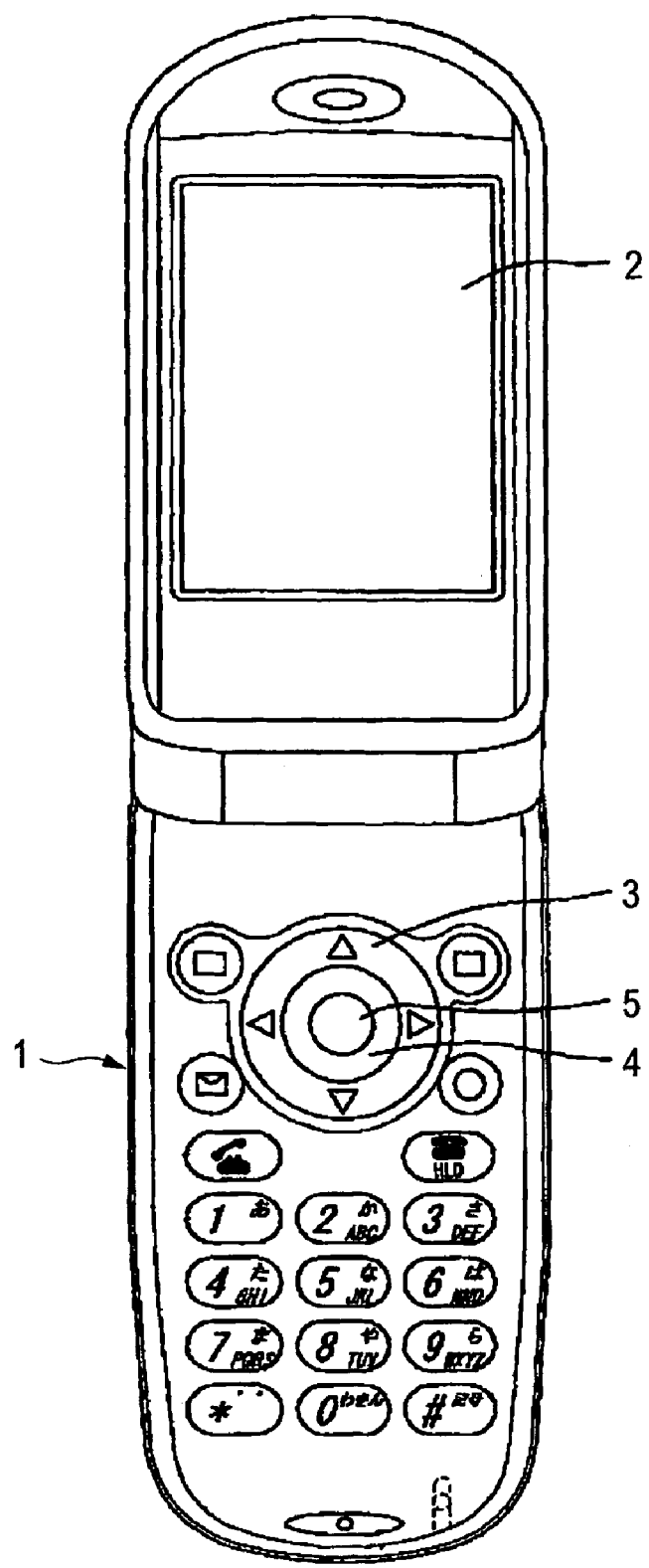
FIG. 1 is a plan view showing a schematic configuration of a mobile phone device to explain a first embodiment of the present invention.

In above Figures, a reference numeral 1 denotes a main body, 2 display portion, 3 direction operation key, 4 second operation key, 5 center key, 6 control portion, 11 conductor member, 12 resistor member, 13 operation button, 15 key control portion, 21 submenu, 201, 202, 203, 204 display area, 1 main body, 2 display portion, 3 first operation button (peripheral button), 31 direction switch, 32 first operation key, 4 second operation button (peripheral button), 41 pressure-sensitive operating device, 42 second operation key, 5 decision button (center button), 51 decision switch, 52 decision key, 6 rubber sheet, 61 four-way projection, 62 pushing point, 63 center projection, 64 buffer structure, and 10 substrate.

BEST MODE FOR CARRYING OUT THE INVENTION

First Embodiment

FIG. 1 is a plan view showing a schematic configuration of a mobile phone device to explain a first embodiment of the present invention. As shown in FIG. 1, in the mobile phone device of the present embodiment, a display portion 2 for displaying information, a first operation button (direction operation key) 3 that can be operated in four directions on the upper/lower and right/left sides, a second operation button (peripheral button) 4 for sensing an operation position and an operation direction based on its tracing operation to output an operation signal, a center key 5 used to define the selected menu item, and the like, and a control portion 6 (not shown) for changing the display contents on the display portion 2 based on the operation signal are provided to a main body 1. Here, the display portion 2 corresponds to an example of a displaying unit in claims, the second operation key 4 corresponds to an example of an operating unit, and the control portion 6 corresponds to an example of a controlling unit are provided to a main body 1.

The annular first operation button 3 is provided to the main body 1. The annular second operation button 4 is provided on the inner peripheral side of the first operation button 3. The center key 5 is provided on the inner peripheral side of the second operation button 4. In the present embodiment, the center key 5, the second operation button 4, and the first operation button 3 are arranged concentrically.

Figure 2:
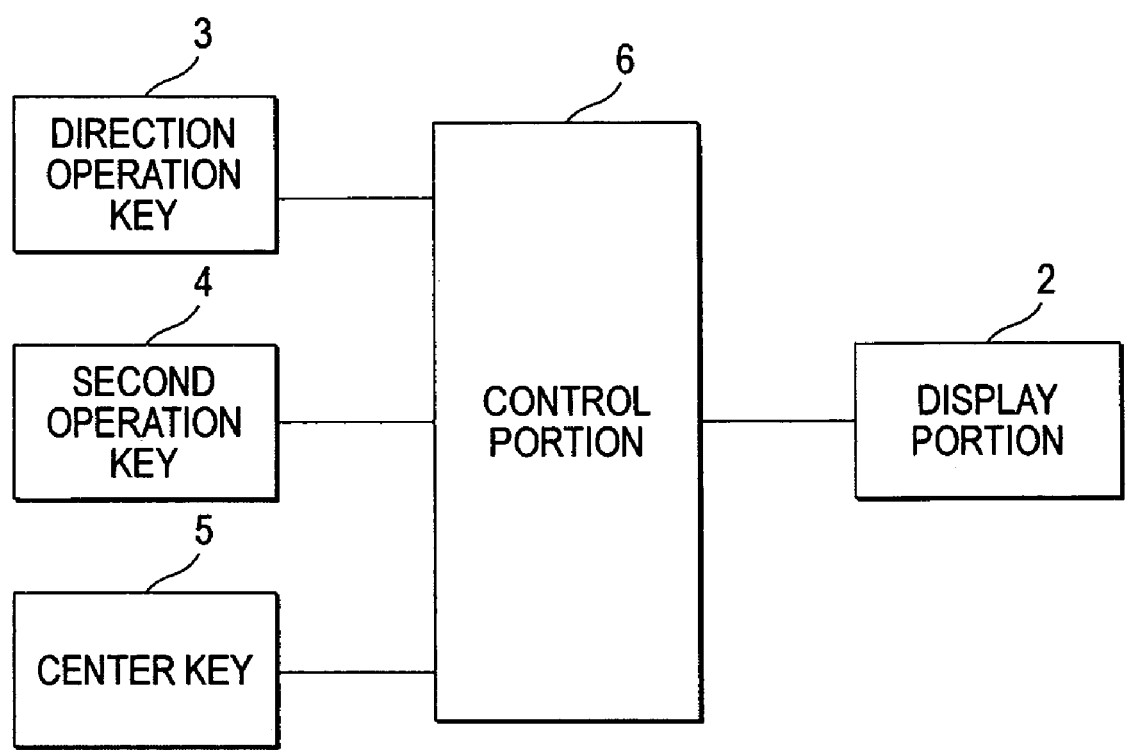
FIG. 2 is a block diagram explaining functions of respective constituent elements that the mobile phone device of the present embodiment has.

FIG. 2 is a block diagram explaining functions of respective constituent elements that the mobile phone device of the present embodiment has.

The first operation button 3 is the operation key in which a switch is provided to areas located under four operating points on the upper/lower and right/left sides respectively and which moves a cursor displayed on the display portion 2 longitudinally and laterally or moves a display on the display portion 2 in either of the upper/lower and right/left directions. The first operation button 3, when pushed down, outputs the operation signal to the control portion 6.

The second operation button 4 is a pressure-sensitive operating device provided onto a substrate (not shown), and senses the operation position and the operation direction and outputs the operation signal to the control portion 6 when a tracing operation is applied by the operator's finger that touches this button. In this case, the "tracing operation" signifies an operation that shifts a pushing position while pushing down the button. In this example, it is supposed that the second operation button 4 senses either of the clockwise direction and the anticlockwise direction as the operation direction. A detailed structure of the second operation button 4 will be described later.

The center key 5 is pushed to define the selected menu item, or the like, and outputs the operation signal to the control portion 6 when pushed down.

The display portion 2 displays stored information such as a menu indicating the service contents, a submenu consisting of plural menu items contained in each menu item, etc. and received information based on the command from the control portion 6.

The control portion 6 executes a display control of the display portion 2, based on the operation signal accepted from the first operation button 3, the second operation button 4, and the center key 5. The control portion 6 changes the display on the display portion 2 when the first operation button 3, the second operation button 4, or the center key 5 is operated. In particular, when the second operation button 4 is operated, the control portion 6 changes the display on the display portion 2 in response to its operation direction and its operation speed. Also, in the case where a plurality of functions are allocated to the second operation button 4, the control portion 6 switches the function of the second operation button 4 in response to the display contents on the display portion 2 when the second operation button 4 accepts the tracing operation.

Figure 3:
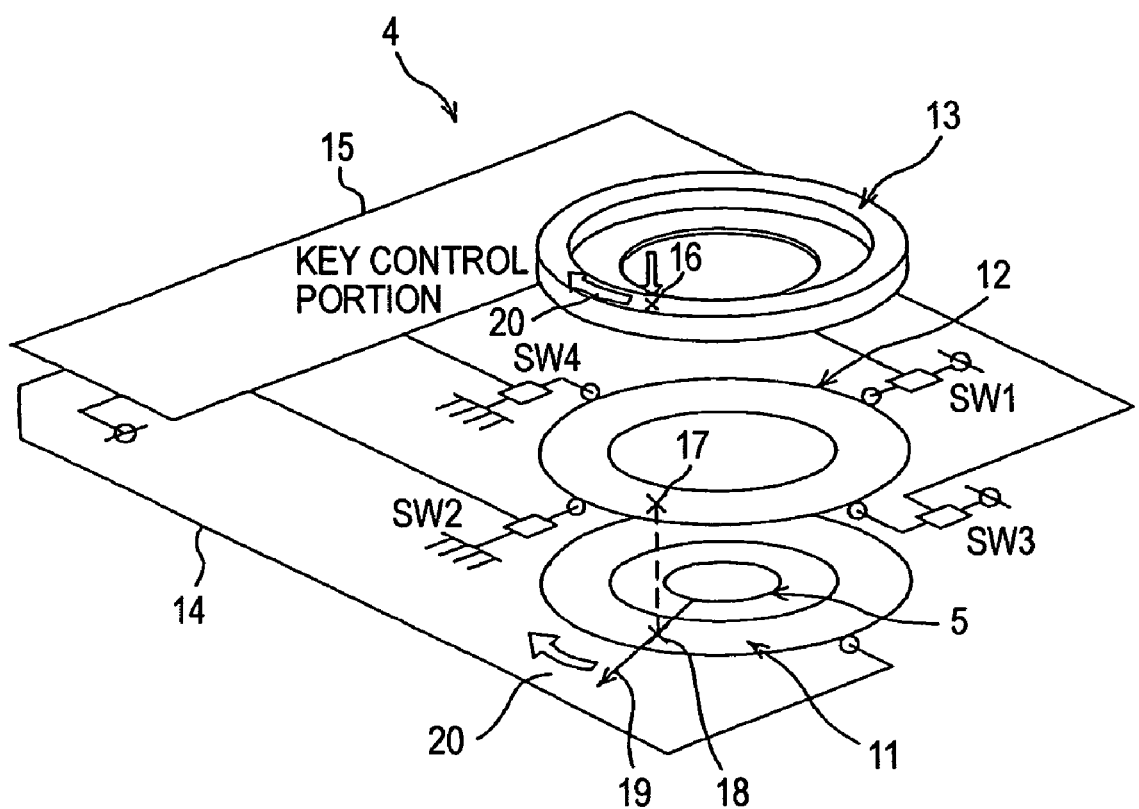
FIG. 3 is a view explaining a configuration of a second operation button.

FIG. 3 is a view explaining a configuration of the second operation button.

The second operation button 4 is constructed roughly by an annular planar conductor member 11, an annular planar resistor member 12 provided onto the conductor member 11, and an annular planar operation button 13 as an operation member provided onto the resistor member 12 to project its outer periphery upward, and is connected to a key control portion 15 via a conductor wire. The conductor member 11 is connected to the key control portion 15 via a conductor wire 14. Also, the resistor member 12 is connected to the key control portion 15 via four analog switches SW1 to SW4 and conductor wires connected these analog switches SW1 to SW4 respectively. In this case, the analog switches SW1 to SW4 are provided on an outer periphery of the resistor member 12 at equal intervals. Also, the analog switches SW1 and SW2 are provided in positions that oppose to each other and similarly the analog switches SW3 and SW4 are provided in positions that oppose to each other.

The key control portion 15 calculates a pushed position of the operation button 13 and a changing speed of the pushed position based on a voltage value generated in the resistor member 12 during the operation, and senses the operation direction and the operation speed of the operation button 13.

When any portion of the operation button 13, e.g., a position 16, is pushed down, the resistor member 12 receives pressure at a point 17 corresponding to this position 16 and then the point 17 of the resistor member 12 comes into contact with a point 18 of the conductor member 11. At this time, a current is supplied to the key control portion 15 from the switches SW1, SW3 via the resistor member 12, the conductor member 11, and the conductor wire 14, and respective voltage values between the switches SW1 to SW4 are A/D-converted by the key control portion 15 and calculated. A voltage value between the analog switches SW1 and SW2 and a voltage value between the analog switches SW3 and SW4 are different in response to positions of the contact points 17, 18. Therefore, the key control portion 15 senses a pushed-position indicating direction 19 indicating which position of the operation button 13 was pushed down, based on the calculated voltage values between the switches. In this case, the pushed-position indicating direction 19 unit the direction that points at the position 16 of the operation button 13 from the center of the second operation button 4.

When the position 16 of the operation button 13 is pushed down and then the pushed position is changed (traced) clockwise, for example, while pushing down this operation button 13, the pushed-position indicating direction 19 is similarly changed following upon a change of the pushed position. As a result, the key control portion 15 can calculate a changing direction 20 of the pushed-position indicating direction 19 and a changing speed by sensing the operation position every predetermined time period, and can sense the operation direction (either of the clockwise direction and the anticlockwise direction) and the operation speed of the operation button 13.

Figure 4A:
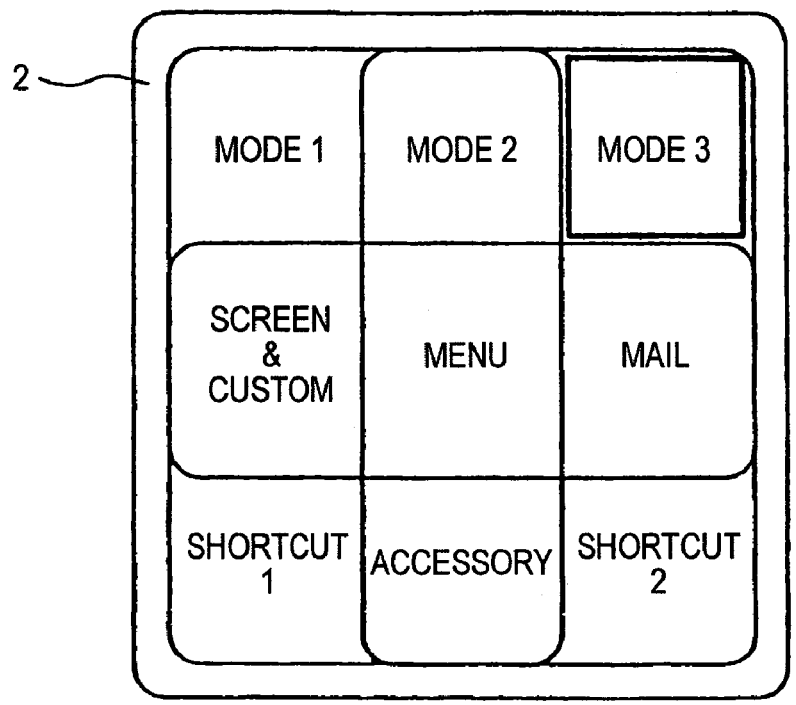
FIG. 4 is a view showing a display example on a display portion to explain an operation of the second operation button in the first embodiment.
Figure 4B:
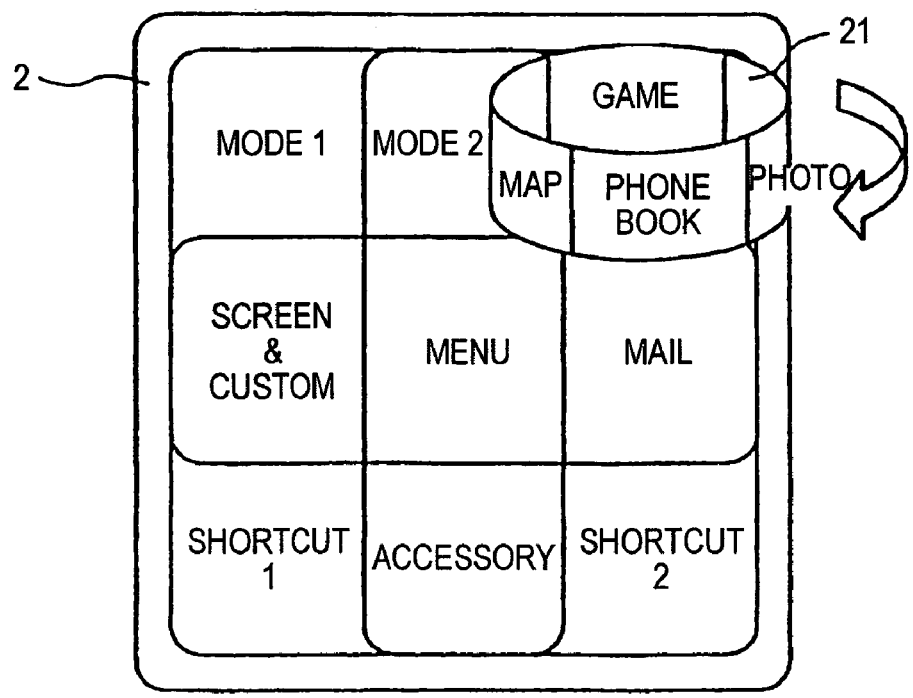

An operation taken when a hierarchical menu is displayed on the display portion 2 and then operated by the second operation button 4 will be explained hereunder. Here, an example of an operation taken to select a menu item from a lower menu (submenu) when an upper menu is displayed on a hierarchical menu in which each item of the menu contains further menus is illustrated. FIG. 4 is a view showing a display example on the display portion to explain an operation of the second operation button in the first embodiment. FIG. 4(a) shows a display example of a menu screen in which nine menu items are arranged an 3×3 matrix, and FIG. 4(b) shows a display example of a menu screen in which submenus of one menu item are displayed.

As shown in FIG. 4(a), a menu screen on which nine menu items such as "mode 1", "mode 2", "mode 3", "screen & custom", "mail", "shortcut 1", "accessory", and "shortcut 2" are arranged is displayed on the display portion 2. When the operator of the mobile phone device operates the first operation button 3 in a predetermined direction, a cursor is moved to "mode 3" on the display portion 2 by the command of the control portion 6. When the operator pushes a surface of the second operation button 4 in this situation, the control portion 6 causes the display portion 2 to display a menu screen containing a submenu 21 that consists of respective items of "game", "photo", "phone book", and "map" shown in FIG. 4(b). Here, since geometrical shapes of the display contents displayed on the display portion 2 are determined previously to conform to the operable direction of the second operation button 4, the submenu 21 is arranged such that respective items constitute an elliptic shape.

Then, when the operator traces clockwise the surface of the second operation button 4, the display portion 2 changes a display based on the command of the control portion 6 such that an alignment of respective items of the submenu 21 is changed clockwise. More particularly, when the operator traces clockwise the surface of the second operation button 4, the item positioned on the submenu 21 displayed on the display portion 2 is changed sequentially like "game"→"map"→"phone book"→"photo" to cooperate with the operation direction and the operation speed of the tracing operation applied to the second operation button 4. In other words, when the menu items arranged like the geometrical shape constituting an elliptic shape are displayed on the display portion 2, the operator can change the display as imagined by executing the circular tracing operation in the direction along the annular shape of the second operation button 4. In this case, the display may be changed in such a manner that, when the operator traces the second operation button 4, a cursor moves in each item of the submenu 21.

Also, a changing speed of the display on the display portion 2 is linked with the operation speed of the second operation button 4. That is, the display on the display portion 2 is changed slowly when the operator traces the second operation button 4 slowly, and conversely the display on the display portion 2 is changed quickly when the operator traces the second operation button 4 quickly.

As described above, in the mobile phone device of the present embodiment, when a desired menu item is selected by the first operation button 3 (pointed by a cursor) and then the second operation button 4 is subject to the tracing operation, the key control portion 15 senses the operation direction and the operation speed of the tracing operation and then changes the display contents on the display portion 2 in response to the sensed operation direction and the sensed operation speed.

At this time, when the menu items, etc. of the display portion 2 are constructed to at least partially agree with the operation direction of the second operation button 4, the display contents on the display portion 2 are changed to answer the operation direction and the operation speed of the second operation button 4. Therefore, the operator can take a desired operation as imagined while watching the display portion 2. As a result, the mobile phone device becomes more convenient.

Also, in the mobile phone device in the present embodiment, the second operation button 4 is arranged adjacently on the inner side of the first operation button 3. Therefore, even when the second operation button 4 and the first operation button 3 should be operated alternately, these buttons can be operated only with the thumb of one hand not to change the manner of holding the main body 1. Here, the second operation button may be arranged adjacently on the outer side of the first operation button.

Also, in the mobile phone device in the present embodiment, the second operation button 4 executes predetermined actions in reply to the tracing operation and does not need members and mechanism to slide. Thus, wear and tear of the parts can be reduced and thus the long-lived operating portion can be provided.

Also, the action taken when the hierarchical menu is displayed on the display portion 2 and then operated by the second operation button 4 is explained as above. In this event, when the display contents which consist of a plurality of choices and whose geometrical shapes displayed on the display portion are previously determined to meet the operable direction of the second operation button are displayed instead of the menu and then the second operation button is operated, the display on the display portion may be changed in such a way that the changing direction of the display contents agrees with the operation direction.

Second Embodiment

In the first embodiment, as the example of the function of linking the operation of the second operation button 4 and the display contents on the display portion 2 together, the case where the lower submenus belonging to this menu item are displayed when the second operation button 4 is operated in a situation that a cursor is positioned on some menu item is explained. But other functions can be allocated to the second operation button 4. As second and third embodiments, the case where the second operation button 4 has various functions will be explained hereunder. In this case, since respective constituent elements of the mobile phone devices in the respective embodiments to be explained hereinafter are similar to respective constituent elements of the mobile phone device in the first embodiment, their explanation will be omitted herein by affixing the same symbols to these constituent elements.

In the second embodiment, an example in which a map is displayed on the display portion 2 and then the display contents (map) are enlarged/reduced by the second operation button 4 will be explained. In this example, the case where a function of reducing a display range and displaying a map in detail in an enlarged mode (zoom up) when the tracing operation is applied clockwise to the second operation button 4 and also a function of enlarging a display range and displaying a map in a reduced mode (zoom down) when the tracing operation is applied anticlockwise to the second operation button 4 are allocated to the second operation button 4 is illustrated.

In the case where the contents of the selected menu item corresponds to a map display service, i.e., in the contents such as a service to display the present position or a desired spot on a map, a service to search a route from the present position to user's destination and display such route, etc., it is desired that a map display on the display portion 2 can be changed. For example, it is desired that a scale of a map should be changed in such a way that a map in an area not displayed is displayed by moving a display area, a wide area is displayed, or a desired area is enlarged and displayed in detail. In the mobile phone device in the present embodiment, the display area is moved by the first operation button 3 and also a scale of a map is changed by the second operation button 4.

Figure 5A:
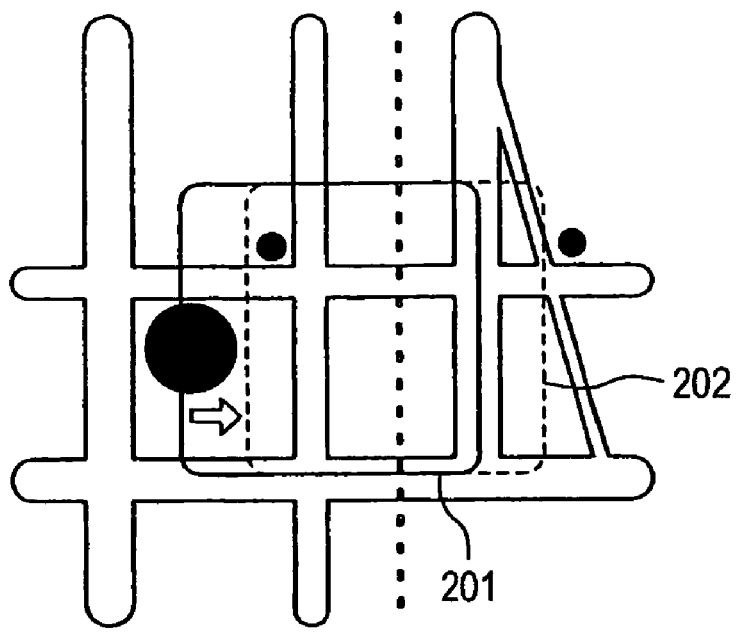
FIG. 5 is a view showing a map to explain an operation of the second operation button in a second embodiment.
Figure 5B:
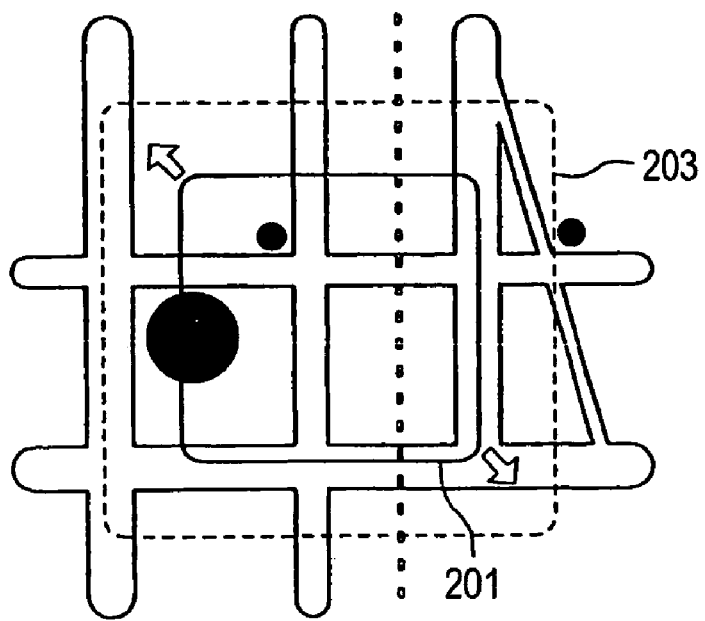

FIG. 5 is a view showing a map to explain an operation of the second operation button in the second embodiment. FIG. 5(a) shows a change of the display when the first operation button 3 is operated, and FIG. 5(b) shows a change of the display when the second operation button 4 is operated.

As shown in FIG. 5(a), when the right side of the first operation button 3, for example, is pushed down in a situation that a display area 201 is being displayed on the display portion 2, the area displayed on the display portion 2 is moved rightward on the map based on the command from the control portion 6, and the display on the display portion 2 is changed to the contents shown in a display area 202. When the first operation button 3 is operated in this manner, the display on the display portion 2 can be changed to a display of a desired map area.

In contrast, as shown in FIG. 5(b), when the tracing operation is applied anticlockwise to the second operation button 4 in a situation that the display area 201 is being displayed on the display portion 2, the area displayed on the display portion 2 is changed to a wide area (zoom down) based on the command from the control portion 6 to respond to the operation speed, and the display on the display portion 2 is changed to the contents shown in a display area 203. In this case, when the tracing operation is applied clockwise to the second operation button 4, an area displayed on the display portion 2 is reduced to respond to the operation speed and the display on the display portion 2 is changed to the display of the detailed map. Namely, a scale of the map displayed on the display portion 2 is changed quickly by tracing quickly the second operation button 4 whereas a scale of the map displayed on the display portion 2 is changed slowly by tracing slowly the second operation button 4.

As explained above, in the mobile phone device in the present embodiment, since the zoom-up and zoom-down functions are allocated to the second operation button 4, a scale of the map display on the display portion 2 can be changed to be linked with a tracing speed on the second operation button 4. Therefore, the operator can change (zoom up and zoom down) the map display at a desired speed. Also, the display contents can be linked with the operation image. As a result, the mobile phone device becomes more convenient.

Also, in the mobile phone device in the present embodiment, the second operation button 4 is arranged adjacently on the inner side of the first operation button 3. Therefore, even when the second operation button 4 and the first operation button 3 should be operated alternately, these buttons can be operated only with the thumb of one hand without change of the manner of holding the main body 1. For example, when a map is displayed on the display portion 2, the operator first causes to display a wide area map by tracing the second operation button 4 anticlockwise, then causes to display a desired area by pushing down the first operation button 3, and then traces the second operation button 4 clockwise. Thus, the operator can be displayed easily a desired area on the map in an enlarged fashion only by the operation using the thumb of one hand not to change the manner of holding the main body 1. In this case, the second operation button may be arranged adjacently on the outer side of the first operation button.

Also, in case the mobile phone device in the present embodiment has an imaging function, a zoom of the camera may be changed to cooperate with this operation when the second operation button 4 is subject to the tracing operation.

Third Embodiment

In the present embodiment, an example in which characters, etc. of the electronic mail, or the like are displayed on the display portion 2 and the display contents are moved (scrolled) by the second operation button 4 will be explained. In this example, the case where a function of changing the display contents such that the display area of characters, etc. is moved (scrolled) downward when traced clockwise and the display area is scrolled upward when traced anticlockwise is allocated to the second operation button 4 is illustrated. When the operator is going to read a lengthy mail that cannot be displayed on the display portion 2 at a time, he or she can display a continuation of the mail, which is not displayed on the display portion 2, at a desired speed by tracing the second operation button 4 clockwise while scrolling the display screen downward in synchronism with a speed of the tracing operation. Therefore, the display screen can be scrolled longitudinally at a high speed by tracing the second operation button 4 at a high speed. As a result, the display screen is scrolled merely at a constant speed in the prior art, but the display screen can be scrolled at an operator's desired speed and also the operation image and the display contents can be linked together, and thus a convenience can be improved.

Also, a function of changing the display such that a hand of an analog clock is moved together with the tracing operation when the second operation button 4 is traced in a situation that an image of the analog clock is displayed on the display portion 2 may be allocated to the second operation button 4. In addition, a function of setting a time or setting an alarm may be allocated via the control portion 6.

Also, when an image of a dial portion, which is used in a dial safe and to a periphery of which numerals are assigned, is displayed on the display portion 2, a function of a dial lock system may be accomplished. More particularly, a function of changing the display such that a dial is turned together with the tracing operation when the second operation button 4 is traced may be allocated to the second operation button 4. In addition, a function of releasing a key lock when a change of the displayed dial agrees with the previously registered dialing method (e.g., spun the dial three times rightward and four times leftward to get predetermined numerals) may be allocated via the control portion 6.

Also, a function of changing the display such that a dial is turned together with the tracing operation when the second operation button 4 is traced in a situation that an image of a dial telephone is displayed on the display portion 2 may be allocated to the second operation button 4. In addition, a function of calling the number indicated by the displayed dial may be allocated via the control portion 6.

Fourth Embodiment

Figure 6:
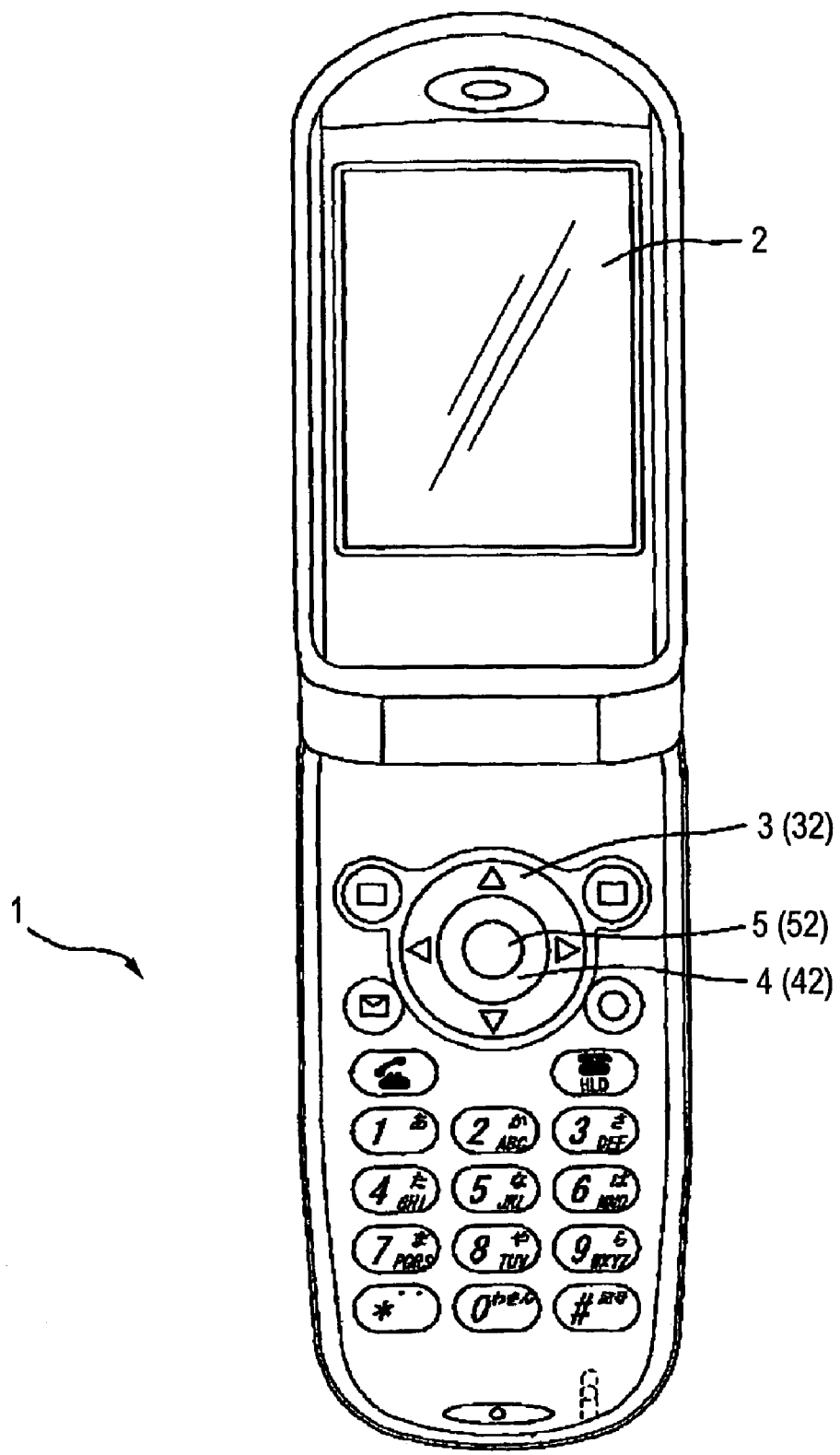
FIG. 6 is a plan view showing a schematic configuration of a mobile phone device according to the embodiment of the present invention.

FIG. 6 is a plan view showing a schematic configuration of a mobile phone device according to the embodiment of the present invention. In the mobile phone device of the present embodiment, the display portion 2 for displaying information, the first operation button 3, the second operation button 4 and a decision button 5 as the operating unit described later, and a control portion 6 (not shown) as a controlling unit that changes the display contents on the display portion 2 based on the operation signal described later are provided to the main body 1.

The display portion 2 displays stored information such as a menu indicating the service contents, a submenu consisting of plural menu items contained in each menu item, etc. and received information based on the command from the control portion.

The annular first operation button 3 as the direction operation button that can be operated in four directions on the upper/lower and right/left sides, the annular second operation button 4 provided on the inner peripheral side of the first operation button 3 to sense the operation position and the operation direction of a "pushed tracing operation", described later, and output the operation signal, and the true-circular decision button 5 provided on the inner peripheral side of the second operation button 4 and used to define the selected menu item, and the like are provided to the operating unit within a particular area in which the one-hand operation can be executed. That is, in the present embodiment, as the operating unit, the decision button 5, the second operation button 4, and the first operation button 3 are arranged concentrically and annularly in this order from the inner side to the outer side within a particular area in which the one-hand operation can be executed.

Figure 7:
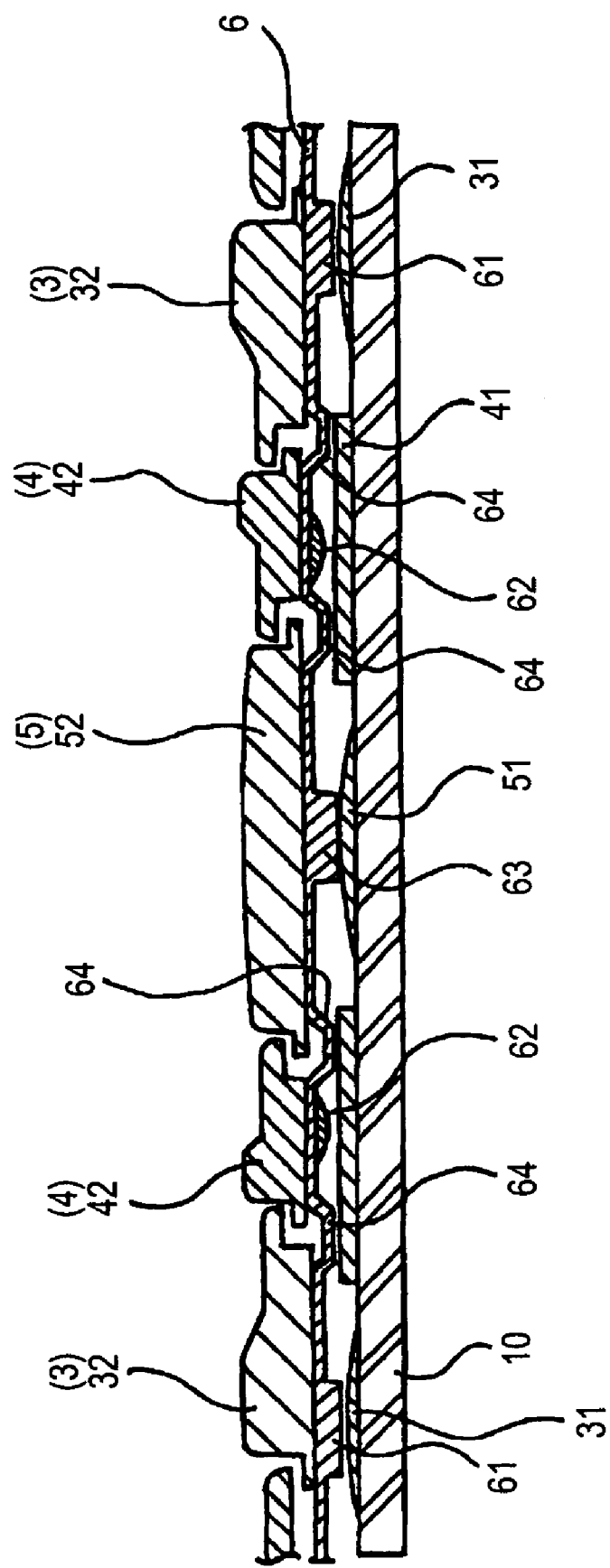
FIG. 7 is a sectional view showing a pertinent configuration of an input device of the mobile phone device according to the embodiment of the present invention.

FIG. 7 is a sectional view to explain a configuration and a function of an input device in the present embodiment, and shows internal structures of the first operation button 3, the second operation button 4, and the decision button 5 shown in FIG. 6.

In the input device of the present embodiment, respective direction switches 31, a decision switch 51, and pressure-sensitive operating devices 41 are mounted on a substrate 10 in the main body 1. Also, an integral rubber sheet 6 is deposited over respective direction switches 31, the decision switch 51, and the pressure-sensitive operating devices 41, and respective operation keys 32, 42 and a decision key 52 are fitted onto an upper surface of the rubber sheet 6.

Also, projections 61, 63 and pushing points 62 protruded to respective direction switches 31, the decision switch 51, and the pressure-sensitive operating devices 41 respectively are provided to a lower surface of the rubber sheet 6, which opposes to respective direction switches 31, the decision switch 51, and the pressure-sensitive operating devices 41, and also buffer structures 64 for serving a buffering function are provided. This buffer structure 64 is constructed by a wall surface that becomes depressed in a state that such surface is inclined obliquely downward, and absorb an impact force acting to both sides of this wall surface while using this wall surface as the boundary.

The first operation button 3 is composed of direction switches 31, a column-like (or cylindrical) projection 61 provided to the lower surface of the rubber sheet 6, and a first operation key 32. The direction switches 31 are provided directly under predetermined positions of the first operation key 32, which correspond to four operating points on the upper/lower and right/left sides (only two locations are shown in FIG. 7).

Therefore, when the projection (this is called a "four-way projection") 61 provided to four locations (only two locations are shown in FIG. 7) on the upper/lower and right/left sides of the rubber sheet 6 is pushed down via the first operation key 32, the direction switch 31 provided just under such projection is turned ON. Then, a cursor displayed on the display portion 2 is moved longitudinally or laterally, or the information displayed on the display portion 2 is moved in either of the longitudinal or lateral direction.

The second operation button 4 is composed of an annular pressure-sensitive operating device 41 described later, a pushing point 62 consisting of a projection that is provided annularly on the lower surface of the rubber sheet 6, and the second operation key 42. The annular pressure-sensitive operating device 41 is arranged just under the second operation key 42.

The second operation key 42 is used to select a predictive conversion candidate described later, and the like. When the operator's finger (e.g., a tip of the thumb, or the like) touches this key to conduct the tracing operation, the annular pushing point 62 provided to the rubber sheet 6 traces the annular pressure-sensitive operating device 41 provided onto the substrate 10. This pressure-sensitive operating device 41, when traced, senses the operation position and the operation direction, and then outputs a sensed signal corresponding to them to the control portion.

In this case, the "tracing operation" signifies the operation that shifts a pushing position while the button is kept in its pushed-down state. In the present embodiment, it is supposed that either of the clockwise direction and the anticlockwise direction is sensed as the operation direction.

Here, both the first operation button 3 and the second operation button 4 are used to execute the same pushing operation, but an operating load of the direction switch 31 is set two times or more larger than an operating load of the pressure-sensitive operating device 41. Therefore, since respective reactions of the finger received from the first operation button 3 and the second operation button 4 are different, the operator can easily discriminate which one of both buttons is pushed down, based on a pushing feeling, and thus the wrong operation can be prevented.

The decision button 5 is composed of a decision switch 51, a column-like (or cylindrical) projection (this is called a "enter projection" herein) 63 provided onto the lower surface of the rubber sheet 6, and a decision key 52. The decision switch 51 is provided immediately under the decision key 52.

Therefore, when the decision switch 51 provided just under the center projection 63 is turned ON by pushing down this center projection 63 via the decision key 52, i.e., when the item selected from the menu items displayed on the display portion 2 (to which a cursor is pointed by operating the first operation button 3) is defined by pushing down this decision button, the operation signal is output to the control portion.

Also, in the present embodiment, a predetermined clearance is provided between the first operation key 32 and the second operation key 42 and between the second operation key 42 and the decision key 52 such that respective keys do not come into contact mutually.

Accordingly, when the first operation key 32 is pushed down, such first operation key 32 does not come into contact with the second operation key 42 because of the presence of the clearance, otherwise the second operation key 42 is not pushed down to such an extent that the pressure-sensitive operating device 41 provided under the second operation key 42 is operated even when both keys touch mutually.

Similarly, when the second operation key 42 is pushed down to execute the tracing operation of this second operation key 42, such second operation key 42 does not come into contact with the decision key 52 because of the presence of the clearance, otherwise the second operation key 42 is not pushed down to such an extent that the decision switch 51 provided under the decision key 52 is operated even when both keys touch mutually.

Also, in the present embodiment, the first operation key 32, the second operation key 42, and the decision key 52 are bonded to the rubber sheet 6 and are coupled together. The foregoing buffer structure 64 is provided between the first operation key 32 and the second operation key 42 and between the second operation key 42 and the decision key 52 on the rubber sheet 6.

Therefore, even when the first operation key 32 is operated to push down, a force transmitted to the neighboring second operation key 42 is reduced by the buffer structure 64. Thus, the pushing point 62 never operates the pressure-sensitive operating device 41. Similarly, even when the tracing operation is applied to the second operation key 42, the four-way projection 61 never operates the direction switch 31 and also the center projection 63 never operates the decision switch 51.

Also, in the present embodiment, a part of the foregoing buffer structure 64 is brought into touch with a non-operated portion of the pressure-sensitive operating device 41. Accordingly, the first operation key 32, the second operation key 42, and the decision key 52 are held in their lifted (supported) state from respective switches. In other words, respective distances between the four-way projection 61, the pushing points 62, and the center projection 63 provided onto the rubber sheet 6 and the direction switches 31, contact locations of the pressure-sensitive operating device 41, and the center switch 51 provided directly under respective members can be ensured, and the operating strokes of respective switches and operating devices can be ensured.

In addition, in the present embodiment, surface shapes of the first operation key 32 and the second operation key 42 are set lower than neighboring keys on the inner side of the keys, but set higher than neighboring keys on the outer side of the keys. Since such configuration is employed, a pushed depth of the first operation key 32 can be suppressed to the lowest minimum even when the finger also touches the first operation key 32 at the same time the finger traces the second operation key 42, for example. Also, a pushed depth of the second operation key 42 can be suppressed to the lowest minimum even when the finger also touches the second operation key 42 at the same time the decision key 52 is pushed down.

Also, in the present embodiment, unlike a surface of the direction switches 31, a surface of the second operation key 42 is formed of the material whose coefficient of friction is small (not shown). Thus, the tracing operation of the second operation key 42 is made easily.

Also, the control portion controls the display on the display portion 2 based on the operation signals received from the direction switches 31, the pressure-sensitive operating device 41, and the decision switch 51. For example, the control portion changes the display on the display portion 2 when the operator operates the first operation button 3, the second operation button 4, or the decision button 5. Also, in addition to the above, the control portion has a function of generating conversion candidates corresponding to the input character (this is called a "predictive conversion candidate" herein) and displaying these candidates on the display portion 2.

Next, examples of the character conversion when the electronic mail, or the like is formed by using the input device in the present embodiment will be explained hereunder.

Figure 8B:
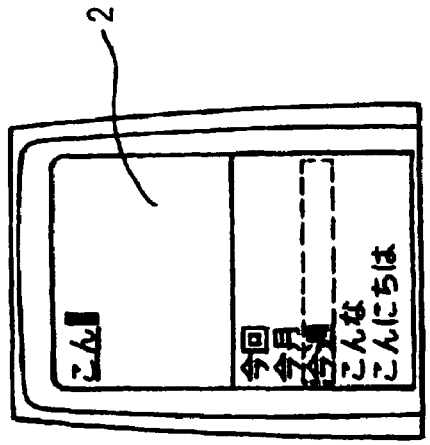
FIG. 8 is a view showing operation procedures of inputting characters in the mobile phone device according to the embodiment of the present invention, wherein (A) is an explanatory view showing display contents on the display portion while character inputting, (B) is an explanatory view showing display contents in a kanji conversion made by a first operation button, and (C) is an explanatory view showing display contents in a spare candidate selection made by the second operation button.
Figure 8C:
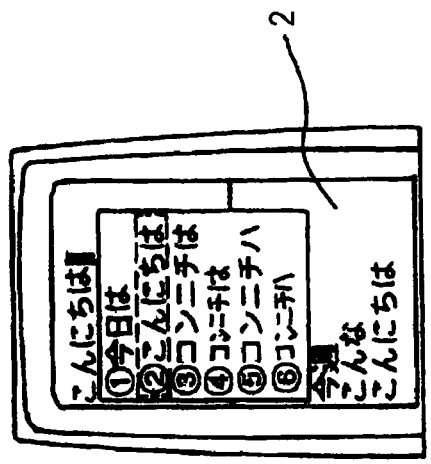
Figure 8A:
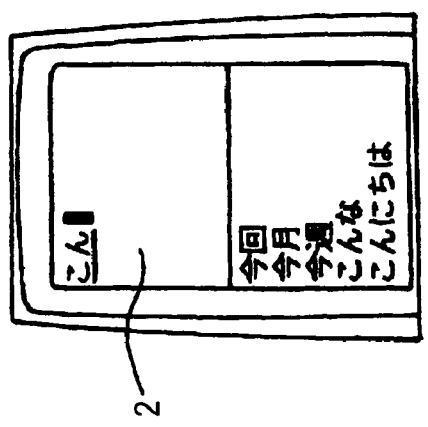

(1) When normally the character conversion is performed, conversion candidates corresponding to the input characters are displayed on the display portion 2 as shown in FIG. 8, by pushing down the upper side or the lower side of the first operation button 3 after the characters are input in FIG. 6.

For example, when ""こんにちは in hiragana" is input, i) ""今日は in kanji and hiragana", ii) ""こんにちは in hiragana", iii) ""コン二チ (single byte) は"", iv) ""コン二チハ in katakana", v) ""コン二チハ (single byte)" . . . etc. are displayed on the display portion 2.

Figure 9A:
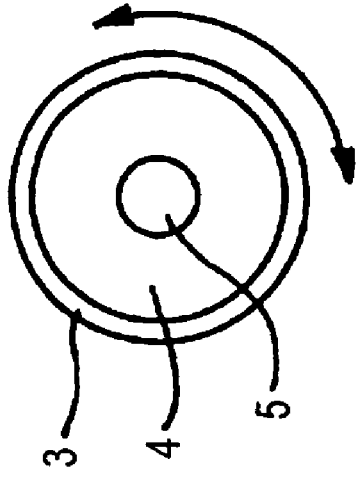
FIG. 9 is a view showing operations in the mobile phone device according to the embodiment of the present invention, wherein (A) is an explanatory view showing an operation in the kanji conversion made by a first operation button, and (B) is an explanatory view showing an operation in the spare candidate selection made by the second operation button.

(2) Therefore, as shown in FIG. 9(A), the first operation button 3 is operated to push down the upper side or the lower side. Therefore, a cursor is moved in the direction corresponding to the pushed side and the operator can select the desired characters.

Figure 9B:
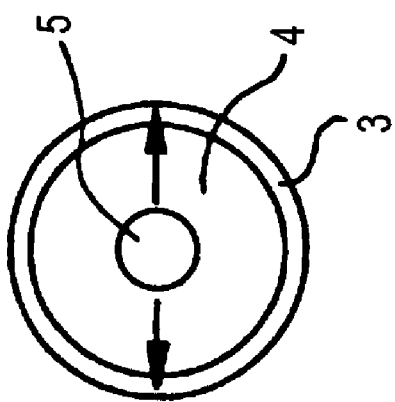

(3) In addition, in the present embodiment, since the control portion has the predictive converting function, characters of the predictive conversion candidates are displayed depending upon the input characters as shown in FIG. 8, and the characters of the predictive conversion candidate can be selected by the second operation button 4 as shown in FIG. 9(B).

For example, as shown in FIG. 8, i) ""今回",", ii) ""今月",", iii) ""今週",", iv) ""こんな",", v) ""こんにちは"" . . . etc. are displayed on the display portion 2 in the course of the inputting operation ""こん..."".

(4) Therefore, a cursor is moved repeatedly in the longitudinally as shown in FIG. 8(B), by executing the tracing operation of the second operation button 4 as shown in FIG. 9(B). As a result, if the tracing operation is stopped at a point of time when the cursor reaches the desired characters, the operator can select the desired characters.

In this manner, according to the present embodiment, after the characters are input, the converting method can be switched not to select/decide the converting method (i.e., the decision key 5 is not used at all) and not to operate another key provided to a location away from the operating area (i.e., only by operating the first operation button 3 and the second operation button 4 located within an area in which the operation can be carried out with the finger tip of the same hand).

Here, in the present embodiment, the first operation button 3 is arranged on the outer side of the second operation button 4. But the second operation button 4 may be arranged on the inner side of the first operation button 3. Also, the pressure-sensitive operating devices 41 is provided to the second operation button 4. But the employed device is not limited to this system. Also, in the present embodiment, the peripheral buttons 3, 4 are composed of the first and second operation buttons, and are arranged double concentrically around the center button 5. But these buttons may be three operation buttons or more, and may be arranged triple concentrically around the center button 5.

As above, the case where the present invention is applied to the mobile phone device is explained. The present invention is not limited to the mobile phone device, and can be applied to PHS (Personal Handyphone System), PDA (Personal Digital Assistant: mobile information communication terminal), or various mobile electronic devices such as the mobile digital still camera, the digital video camera, or the like.

The present invention is explained in detail with reference to particular embodiments, but it is apparent for those skilled in the art that various variations and modifications can be applied without departing from a spirit and a scope of the present invention.

This application is based upon Japanese Patent Application No. 2003-312873 filed on Sep. 4, 2003 and Japanese Patent Application No. 2003-324807 filed on Sep. 17, 2003, the contents of which are incorporated herein by reference.

INDUSTRIAL APPLICABILITY

The electronic device of the present invention possesses the advantage that such device can be operated as imagined while checking the display contents because the display contents on the displaying unit and the operation of the operating unit are linked together, and is useful for the electronic device, e.g., the mobile phone device, PHS, PDA, or the like, in which the contents displayed on the displaying unit are changed when the operating unit is operated.

The input device of the present invention possesses the advantage that such device can input the information in various modes not to impose a limitation on the display contents on the display device and also can execute the inputting operation with the thumb of one hand, or the like in a way that is linked with the display contents, and is useful for the application of the mobile phone device, PHS, PDA, or the mobile electronic device such as the mobile digital still camera, the digital video camera, or the like, and others.

The invention claimed is:
1. An electronic device, comprising:
   a first button which senses an operation direction and an operation speed;
   a second button, arranged in an annular shape to surround the first button, which senses an operation direction and an operation speed along the annular shape;
   a displaying unit comprising a menu and a submenu; and
   a controlling unit which controls a display on the displaying unit such that the position of a cursor on the menu is moved based on the operation of the first button, the submenu is displayed when the second button is pushed, and an item of the submenu is changed based on the operation of the second button along the annular shape.

2. The electronic device according to claim 1, wherein the submenu has the other item, the items of the submenu are arranged in an elliptic shape.

3. The electronic device according to claim 1, wherein the submenu is displayed over the menu at the position of the cursor.

4. The electronic device according to claim 1, wherein the menu and the submenu are configured in a hierarchical structure.

5. An electronic device, comprising: an operating unit further comprising a first button provided in a center portion, a second button arranged on an outer side to surround the first button; a displaying unit; and a controlling unit that controls a display on the displaying unit in response to an operation of the operating unit, the display comprising a menu and a submenu; wherein the operating unit senses a first pressure around the diameter of the first button in an operation direction and an operation speed without rotational movement of the first button; wherein the controlling unit changes an item on the menu of the display based on a first sensed result in accordance with the operation applied to the operating unit; wherein the operating unit senses a second pressure around the diameter of the second button in an operation direction and an operation speed without rotational movement of the second button; wherein the controlling unit changes an item on the submenu of the display based on a second sensed result in accordance with the operation applied to the operating unit.

* * * * *

UNITED STATES PATENT AND TRADEMARK OFFICE
CERTIFICATE OF CORRECTION

PATENT NO. : 7,623,652 B2 Page 1 of 1
APPLICATION NO. : 10/570559
DATED : November 24, 2009
INVENTOR(S) : Mori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 637 days.

Signed and Sealed this

Twenty-sixth Day of October, 2010

David J. Kappos
*Director of the United States Patent and Trademark Office*